US008531979B2

(12) United States Patent
Patil et al.

(10) Patent No.: US 8,531,979 B2
(45) Date of Patent: Sep. 10, 2013

(54) WIRELESS LINK QUALITY MONITORING IN NETWORK-ENABLED TVS

(75) Inventors: Abhishek P. Patil, San Diego, CA (US);
Xiangpeng Jing, San Diego, CA (US);
Aixin Liu, San Diego, CA (US); Djung Nguyen, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 396 days.

(21) Appl. No.: 12/570,369

(22) Filed: Sep. 30, 2009

(65) Prior Publication Data
US 2011/0075576 A1   Mar. 31, 2011

(51) Int. Cl.
*H04L 12/26*  (2006.01)
(52) U.S. Cl.
USPC ............................................ 370/252; 370/241
(58) Field of Classification Search
USPC .................................................. 370/241, 252
See application file for complete search history.

(56) References Cited

U.S. PATENT DOCUMENTS

| 2005/0059350 | A1* | 3/2005 | Sano ............................. 455/67.7 |
| 2008/0013613 | A1* | 1/2008 | Ahmad et al. ................. 375/224 |
| 2008/0037443 | A1* | 2/2008 | Ansari et al. .................. 370/254 |
| 2008/0211919 | A1* | 9/2008 | Kuh ............................... 348/192 |
| 2009/0125969 | A1  | 5/2009 | Hill et al. |
| 2009/0231437 | A1* | 9/2009 | Huang .......................... 348/180 |
| 2009/0259746 | A1* | 10/2009 | Sasaki .......................... 709/224 |
| 2009/0325501 | A1* | 12/2009 | Somasundaram et al. . 455/67.11 |
| 2010/0098047 | A1* | 4/2010 | Zhou et al. .................... 370/345 |
| 2010/0113037 | A1* | 5/2010 | Ong et al. ...................... 455/445 |
| 2010/0322091 | A1* | 12/2010 | Savoor et al. ................. 370/252 |
| 2011/0053513 | A1* | 3/2011 | Papakostas et al. .......... 455/63.1 |
| 2011/0058607 | A1* | 3/2011 | Zhao ......................... 375/240.12 |
| 2011/0122869 | A1* | 5/2011 | Jefremov ...................... 370/352 |
| 2011/0255535 | A1* | 10/2011 | Tinsman ....................... 370/390 |
| 2012/0079520 | A1* | 3/2012 | Weaver et al. ................. 725/14 |

FOREIGN PATENT DOCUMENTS

WO   2008078853   7/2008

* cited by examiner

*Primary Examiner* — Jason Mattis
(74) *Attorney, Agent, or Firm* — John L. Rogitz

(57) ABSTRACT

A networked TV gathers information pertaining to the quality of a wireless link over which the TV receives streamed multimedia content, and presents an indication of the quality to a user, selectively blocks content from display if the quality falls below a threshold, and/or reports poor link quality to a network server for diagnostic action by technical personnel.

9 Claims, 2 Drawing Sheets

WIRELESS LINK QUALITY MONITORING IN NETWORK-ENABLED TVS

I. FIELD OF THE INVENTION

The present invention relates generally to monitoring wireless link quality in network-enabled TVs and more specifically for providing indications thereof to a user.

II. BACKGROUND OF THE INVENTION

Internet enabled TVs opens doors to a lot of opportunities and issues that were absent in traditional TVs. With web-enabled TVs, users now have access to a variety of videos served by various content providers.

Video streaming (especially high definition) is bandwidth intensive and requires sustained throughput for smooth playback. Nevertheless, with new advancements in wireless technologies, it is now possible to achieve the necessary speeds required for streaming HD content within a typical home environment. However, as understood herein wireless performance is sensitive to surrounding (RF) conditions which can change over time. Troubleshooting network related errors can be frustrating for users who are not network savvy.

This in turn can lead to a high volume of customer service calls, a problem that is not resolved simply by providing indications of link status without any insight as to quality of the link. As further recognized herein, even with a correctly setup wireless network, if the surrounding environment is crowded with several wireless networks on the same channel, the quality of video playback will not be enjoyable, in which case link quality, and not the network setup, is the culprit.

SUMMARY OF THE INVENTION

In order to effectively resolve such issues, as understood herein it is advantageous to provide enough information to the end user which can be passed on to the service representative regarding wireless link quality.

Accordingly a system includes a video display, a processor controlling video display, and a TV tuner providing TV signals to the processor for presentation on the display. The processor selectively presents on the display an indication of quality of the link. The display can be the display of a TV. In some example implementations the link is wireless, the network interface is a wireless transceiver, and the link quality indication indicates one or more wireless signal strength, data rate, packet loss, or streaming delay. If desired, the processor can also cause link status information to be presented on the display.

In example embodiments the processor, alone or in concert with a wireless network interface processor communicating with the processor, executes a software-implemented link manager module that may be resident in the TV to determine if link quality violates a threshold and if so to present a prompt on the system for the user to take corrective action. In addition or alternatively, if the processor determines that the link quality violates a threshold it selectively prevents certain content to be received on the network from being presented on the display. For example, if the network conditions are such that they cannot support more than 10 Mbps streams, then the processor does not show online content that requires more than 10 Mbps steady bandwidth. In addition or alternatively, if the processor determines that link quality violates a threshold it sends link quality information to a network server which may perform further diagnostics and determine the best suitable video quality (video transcoded to a lower quality) to be presented to the TV.

The processor may determine if link quality violates a threshold at least in part by testing current link signal strength against a minimum threshold. In addition or alternatively the processor may determine if link quality violates a threshold at least in part by comparing data rate against a threshold minimum data rate. In addition or alternatively the processor may determine if link quality violates a threshold at least in part by comparing packet loss per second against a threshold maximum packet loss per second. Yet again, the processor can determine if link quality violates a threshold at least in part by comparing streaming delay against a threshold maximum delay period.

In another aspect, a TV system includes a display, a processor controlling display, and a network interface communicating with the processor to send multimedia (audio, still picture, and video) data received over a network link thereto. The processor presents on the display a link quality user interface (UI) indicating at least the quality of the link.

In another aspect, a networked TV executes logic that includes gathering information pertaining to quality of a wireless link over which the TV receives streamed multimedia, and then presenting an indication of the quality to a user on, e.g., a network link status screen.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
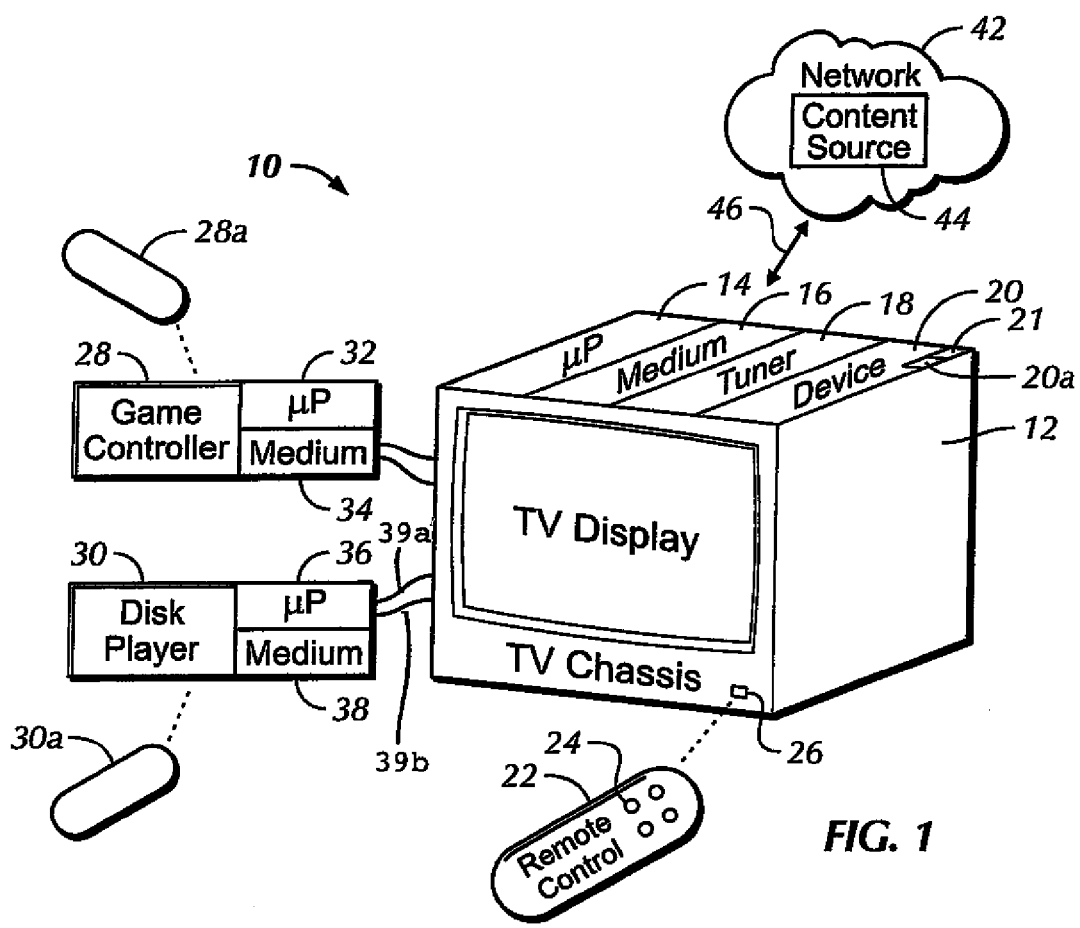
FIG. 1 is a block diagram of an example TV system in accordance with present principles.

Referring initially to FIG. 1, a TV system 10 includes a TV chassis 12 holding a TV processor 14 accessing a computer-readable storage medium 16 such as disk-based or solid state storage that can be non-volatile memory (NVM). The medium 16 may bear a software-implemented network manager module executable by the TV processor 14 alone or acting in concert with the below-described network interface processor to undertake logic herein. Furthermore, the medium 16 may bear software executable by the TV processor 14 to enable reception and display of Internet content on the TV.

The chassis 12 may also hold a TV tuner 18 communicating TV signals to the TV processor 14. There need be only a single analog/digital TV tuner 18 provided in the TV system 10, it being understood that the single analog/digital TV tuner 18 may be physically implemented by one and only one combined digital/analog tuner or by a single digital tuner or by one and only one digital tuner in combination with one and only one analog tuner. In other embodiments only a single analog tuner and no digital tuners may be provided. The tuner 18 may be provided in the chassis 12 or in a set-top box, and the tuner 18 may receive TV signals from a satellite, cable head end, terrestrial broadcast antenna, etc.

A network interface device 20 such as but not limited to an Internet enabled wireless modem may be provided to send Internet signals to the TV processor 14. The device 20 typically includes a processor 20a and a lower level wireless driver 21 that is programmed to gather link quality information including one or more of wireless signal strength, data rate, packet loss, and streaming delay. The interface device 20 may be supported by the TV chassis 12 or it may be external to the chassis but communicating with the TV processor 14. Without limitation the network interface 20 may be a 802.11a/b/g/n transceiver, a 60 GHz transceiver, or other transceiver that can stream high quality multimedia content.

As shown, the TV system 10 also includes a portable handholdable TV remote control (RC) 22. The RC 22, among other things, can have cursor control keys 24 for sending wireless signals to a receiver 26 on the chassis 12. The signals detected by the receiver 26 are sent to the TV processor 14.

In some embodiments the TV system 10 may receive video from a game console 28 such as but not limited to a console in the Sony Playstation® family and/or from a digital disk player 30 such as a Blu Ray® disk player. The console 28 typically includes a game processor 32 accessing a game storage medium 34 storing audio and/or video data and likewise the disk player 30 typically includes a disk processor 36 accessing a disk storage medium 38 storing audio and/or video data. The game console can have a game remote control 28a and the disk player can be associated with a wireless disk player remote control 30a.

Content from the TV tuner 18 and, when provided, from the game console 28/disk player 30 may be presented under control of the TV processor 14 on a TV display 40 such as but not limited to a plasma display or flat panel matrix-type display, either standard definition (SD) and/or high definition (HD).

In one example embodiment the components shown in FIG. 1 communicate multimedia data to each other over high definition multimedia interface (HDMI) links 39A, and the components also communicate control data over consumer electronics control (CEC) links 39B that typically accompany HDMI links. In the example non-limiting architecture shown in FIG. 1 the TV 12 is the central node of the network but it is to be understood that all components may be linked together directly or only some components may be linked together directly, with communication to other components potentially passing through intervening components. In any case, additional content sources such as but not limited universal serial bus (USB) mass storage, personal video recorders (PVR), digital cameras, set-top boxes, removable memory media, etc. may be used in conjunction with the TV system 10.

FIG. 1 shows that the TV can wirelessly receive multimedia data such as audio, video, or still picture data from a network 42 that includes one or more content sources 44. The network 42 may be the Internet and the sources 44 may be established by servers that stream content over wireless links 46 to the TV for reception thereof by the wireless interface 20. As intended herein, an indication of the quality of the wireless link 21 can be provided to the end user of the TV.

Figure 2:
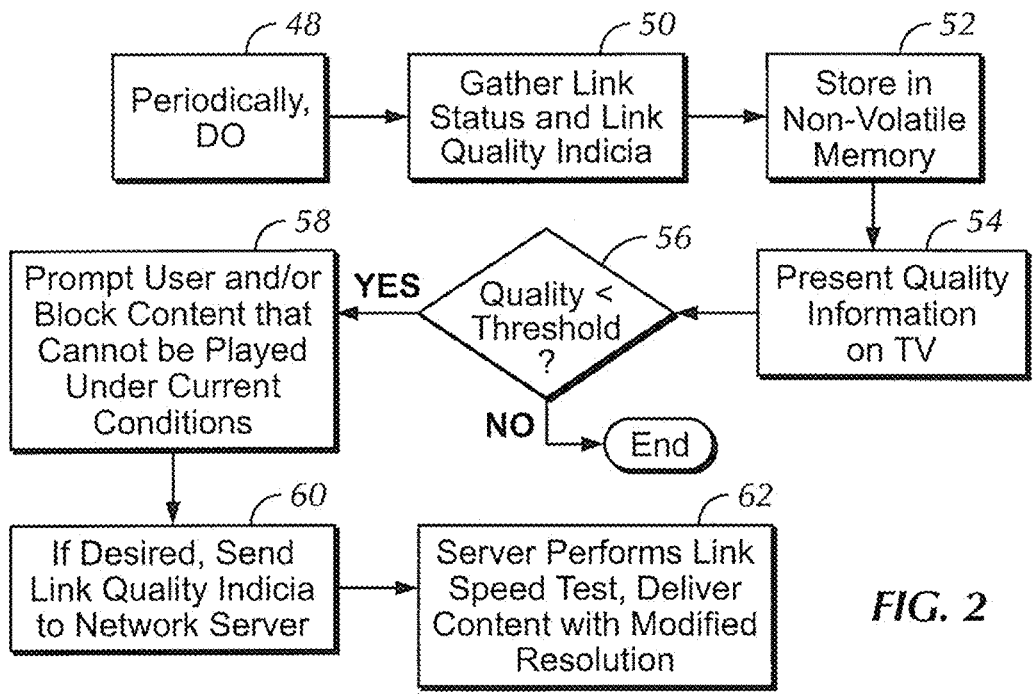
FIG. 2 is example logic that may be executed in accordance with present principles.

Accordingly and now referring to FIG. 2, at block 48 the TV processor 14 may periodically move to block 50 to gather link 46 quality information from, e.g., the driver 21 and also, if desired, link 46 status information such as "connected" or "disconnected". The link quality information can include one or more of wireless signal strength, data rate, packet loss, and streaming delay.

Figure 3:
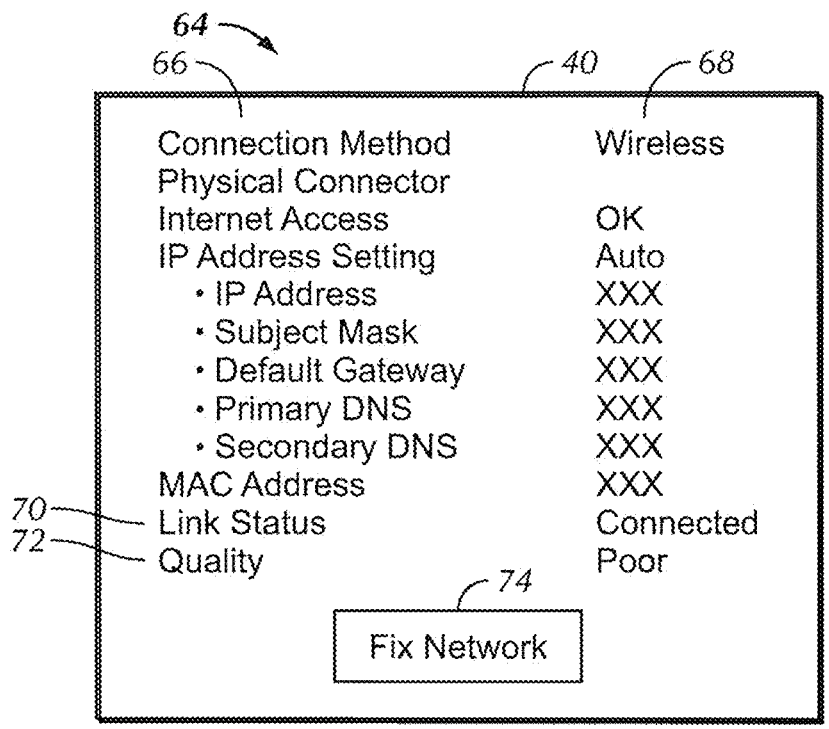
FIG. 3 is a screen shot of a link quality user interface that can be presented on the TV display.

At block 52 the data collected in block 50 may be stored in, e.g., non-volatile memory 16 of the TV. Proceeding to block 54, the link quality data and, if desired, link status information can be displayed on the TV audibly or visually. An example visual indication is shown in FIG. 3, discussed further below.

If desired, the processor 14 can determine at decision diamond 56 whether one or more link quality indicia fall below a threshold. For example, decision diamond 56 may test current link signal strength against a minimum threshold. In addition or alternatively, data rate may be compared against a threshold minimum data rate, and/or packet loss per second may be compared against a threshold maximum packet loss per second, and/or streaming delay may be compared against a threshold maximum delay period.

If one or more quality indicia fall below the respective thresholds, the user may be prompted at block 58 to take corrective action. In addition or alternatively, network content that is of a character, e.g., high bandwidth HD, which prevents proper display under current link quality conditions, may be blocked by the processor 14 from display on the TV. As yet another alternative or added feature, at block 60 the link quality indicia may be sent to a network server associated with the TV manufacturer, so that technical personnel are automatically made aware of deficient link quality conditions. In another embodiment, the link quality indicia may be sent to the content provider's network server so that the server can send to the TV only content that can be supported by current network conditions, e.g., lower bandwidth content.

Still further, if desired at block 62 the network server receiving the report of deficient link quality may perform a link speed test, and the server may then deliver the same content as the content currently being delivered except with a lower resolution or different encoding to match the current link speed. For example, when link speed is low, a lower quality version of a HD video can be transcoded at the server side and delivered to the end user.

FIG. 3 shows a link quality user interface (UI) 64 that can be presented on the TV display 40 on, e.g., a network status screen or a few clicks away under a higher level menu entry of "link quality details". The non-limiting example UI 64 shown in FIG. 3 includes two columns. The first column 66 lists various parameters including connection method, physical connection where applicable, Internet access status, and various network address parameters. The second column 68 lists entries for the first column parameters, e.g., whether Internet access is "OK", numeric values for the various network addresses, etc.

Additionally, as shown a link status entry 70 may be provided in the first column 66 with the second column 68 indicating status (e.g., "connected"). Also, a link quality entry 72 may be provided in the first column 66 and the current quality index (in the example shown, "poor" as might be inferred by the processor 14 from, e.g., signal strength falling below a threshold) is displayed in the second column 68. Further, as shown at 74, if desired when the link quality can no longer satisfy the threshold (and thus cannot sustain the necessary network bandwidth for good quality video streaming applications), a prompt with such information can be presented to the user to fix potential network problems. Clicking on the prompt may cause the link conditions to be uploaded to a network server. This additional information helps customer service technicians understand the environmental conditions in the event that the user decides to seek technical support assistance.

It may now be appreciated that present principles provide users with information about link quality in addition to link status. This can help troubleshoot network performance issues which may not be related to network setup, thus improving customer satisfaction and maintaining brand value. Also, present principles help reduce customer service calls or TV returns, and help customer service handle calls/complains in an effective way since the link quality provides additional information necessary for debugging. Furthermore, the user can be prompted if the current quality is inadequate for smooth video playback over the network. Some implementations may incorporate a SpeedTest widget which can provide the users with information on their Internet connection bandwidth. In this way, users would know if the problem exists outside their home network. Such a system of overall bandwidth reporting functions regardless of the type of network (wired or wireless).

While the particular WIRELESS LINK QUALITY MONITORING IN NETWORK-ENABLED TVs is herein shown and described in detail, it is to be understood that the subject matter which is encompassed by the present invention is limited only by the claims.

What is claimed is:

1. System made by a manufacturer associated with a manufacturer server and receiving TV signals from a TV signal provider different from the manufacturer, the system comprising:
   display;
   processor configured for controlling display;
   TV tuner configured for providing TV signals to the processor for presentation on the display; and
   network interface configured for communicating with the processor to send multimedia data received over a network link thereto, wherein
   responsive to a determination that at least one quality index related to the network link falls below a threshold, the processor is configured to send, to the manufacturer server, a report of poor link quality.

2. The system of claim 1, wherein the link is wireless, the network interface is a wireless transceiver, and the processor presents on the display a link quality indication that indicates at least one of wireless signal strength, data rate, packet loss, and streaming delay.

3. The system of claim 1, wherein the processor also causes link status information to be presented on the display.

4. The system of claim 1, wherein the processor determines if link quality violates a threshold and if so presents a prompt on the system for the user to take corrective action.

5. The system of claim 1, wherein the processor determines if link quality violates a threshold and in response to a determination that link quality violates the threshold, sends link quality indicia to a network server.

6. The system of claim 1, wherein the processor determines if link quality violates a threshold at least in part by testing current link signal strength against a minimum threshold.

7. The system of claim 1, wherein the processor determines if link quality violates a threshold at least in part by comparing data rate against a threshold minimum data rate.

8. The system of claim 1, wherein the processor determines if link quality violates a threshold at least in part by comparing packet loss per second against a threshold maximum packet loss per second.

9. The system of claim 1, wherein the processor determines if link quality violates a threshold at least in part by comparing streaming delay against a threshold maximum delay period.

* * * * *